Figure 1:
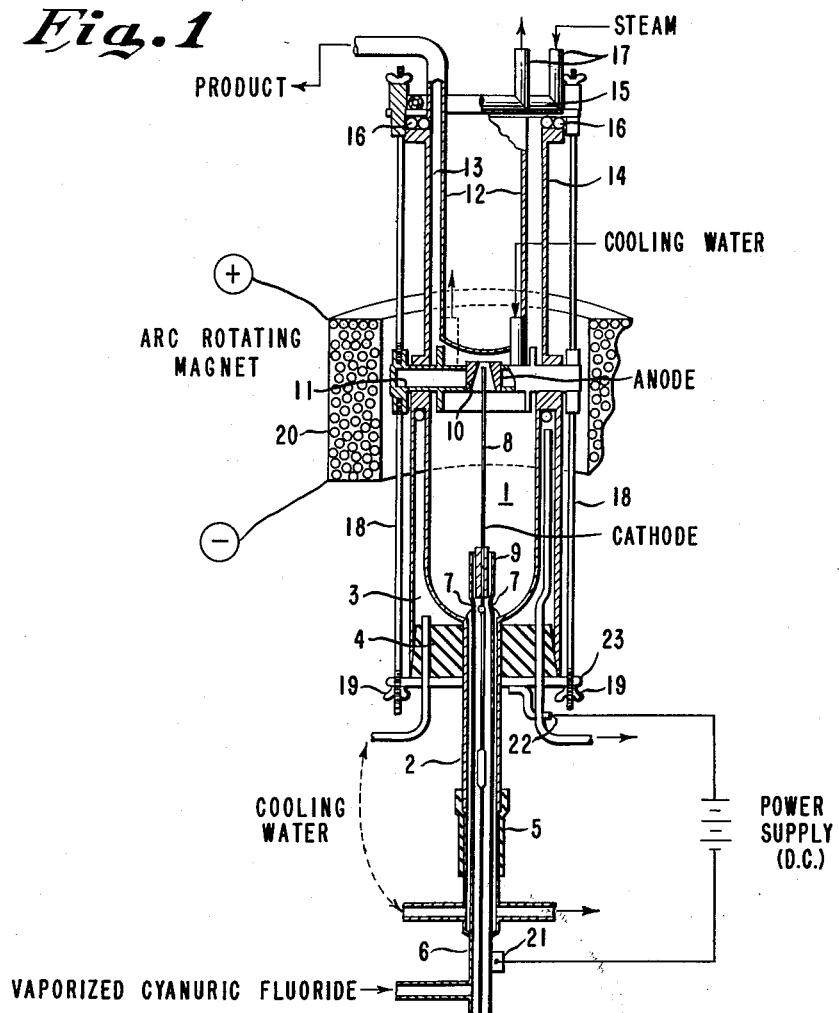

Nov. 14, 1961

R. D. LIPSCOMB ET AL 3,008,798

PREPARATION OF CYANOGEN FLUORIDE

Filed July 17, 1958

INVENTORS
ROBERT D. LIPSCOMB
AND
WILLIAM CHANNING SMITH

BY C. Harold Herr

ATTORNEY

# 3,008,798
PREPARATION OF CYANOGEN FLUORIDE
Robert D. Lipscomb and William Channing Smith, Wilmington, Del., assignors to E. I. du Pont de Nemours and Company, Wilmington, Del., a corporation of Delaware
Filed July 17, 1958, Ser. No. 749,063
10 Claims. (Cl. 23—14)

This invention is concerned with the preparation of cyanogen fluoride.

The present invention provides a process for preparing cyanogen fluoride which comprises heating cyanuric fluoride to a temperature of at least 1200° C. and separating from the gaseous reaction product a product containing at least 10% of monomeric cyanogen fluoride.

The starting material in the process of this invention is cyanuric fluoride, or 2,4,6-trifluoro-1,3,5-triazine,

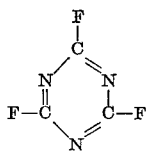

Cyanuric fluoride, a liquid boiling at 73° C., can be prepared by reaction of cyanuric chloride with hydrogen fluoride (Kwasnik, FIAT Review of German Science 1939–1946, Inorganic Chemistry, Part I, 243–244), or with antimony dichlorotrifluoride [Maxwell et al., J. Am. Chem. Soc. 80, 548 (1958)].

A preferred method of preparing cyanuric fluoride consists in reacting cyanuric chloride with sodium fluoride at atmospheric pressure and in the temperature range of 50 to 200° C. Particularly good results are obtained when the reaction is carried out in a non-reactive, organic liquid medium having a dielectric constant at 20° C. of at least 20. Thus, by heating cyanuric chloride and sodium fluoride suspended in cyclic tetramethylene sulfone (tetrahydrothiophene-1,1-dioxide) at 90–175° C. and distilling off the cyanuric fluoride as it forms, reaction is complete within about one hour and the conversion to cyanuric fluoride is of the order of 90%.

The pyrolysis of cyanuric fluoride gives in most cases a mixture of reaction products. Besides unchanged cyanuric fluoride, if any, and cyanogen fluoride, the crude reaction product can contain nitrogen, fluorocarbons (principally carbon tetrafluoride, hexafluoroethane and tetrafluoroethylene), and smaller amounts of cyanogen, trifluoroacetonitrile and other products.

When cyanuric fluoride is pyrolyzed under drastic temperature conditions, i.e., at temperatures in the range of 2000–4000° C. or higher, for example in the flame of an electric arc, fluorocarbons, and especially tetrafluoroethylene, constitute a substantial proportion of the reaction product. Tetrafluoroethylene itself is, of course, a highly valuable material, as is also carbon tetrafluoride. Under milder pyrolytic conditions, e.g., in the temperature range of 1200°–2000° C., cyanogen fluoride predominates, and it may be the sole, or nearly sole reaction product in the temperature range of 1200–1700° C. Since pyrolysis is rather slow below about 1300° C., the preferred temperature range is that from 1300–1700° C.

The process of this invention can be carried out in any of a variety of ways. In one embodiment, cyanuric fluoride is pyrolyzed by passing its vapors, if desired with a substantially inert carrier gas such as nitrogen, helium, or argon, through a reaction zone heated to a temperature of at least 1200° C. The reactor can be a tube of refractory material heated externally to the desired temperature by conventional means, e.g., an electric resistance or induction furnace. The tube may be packed with contact masses of refractory material, such as for example carbon chips to facilitate uniform heating of the vapors. This is the most convenient and preferred way of carrying out the reaction.

Another modification makes use of a short, but very hot reaction zone heated by an electric arc, without, however, allowing contact between the reactant and the arc flame, or plasma. This can be accomplished by means of an electrode arrangement comprising a hollow, cup-shaped anode inside which is positioned a hollow tubular cathode. The arc is struck between the tip of the cathode and the inside wall of the cup-shaped anode. It is thus confined within the cup, and further shielded from contact with the reactant vapors by an inert gas, e.g., nitrogen, introduced continuously through the hollow cathode. The vaporized cyanuric fluoride passes through a narrow annular space formed by the outside wall of the anode and a somewhat wider concentric tube surrounding it, this space constituting the reaction zone. Pyrolysis takes place on the outside wall of the anode, which is heated uniformly by the arc inside it to a temperature estimated to be of the order of 2000° C. This device was used in Example II below.

In yet another embodiment the cyanuric fluoride is pyrolyzed by passing it directly through the flame of an electric arc, where temperatures estimated to be in the range of 2500–4000° C. or even higher are achieved. The arc can be, and most conveniently is, a carbon arc, but arcs in which one or both electrodes are made of metal (e.g., copper, tungsten) are also entirely suitable. This mode of carrying out the pyrolysis gives very high (normally quantitative) conversions of the cyanuric fluoride. However, the extremely high temperatures involved appear to favor the formation of by-products, chiefly tetrafluoroethylene, other fluorocarbons, nitrogen, etc. Thus, less drastic conditions such as those of the first two embodiments discussed above are preferred when optimum yields of cyanogen fluoride are desired.

Another modification consists in submerging the electrodes of an electric arc in liquid cyanuric fluoride. The cyanuric fluoride is vaporized and pyrolyzed in the arc zone and the gaseous reaction products are rapidly cooled by the surrounding liquid and escape from the reaction vessel to suitable collecting systems.

The pressure at which the reaction is carried out is not critical. In general, however, it is much preferred to operate at reduced pressures, which can be as low as 1 mm. of mercury but are desirably in the range of 10–300 mm. of mercury. This is especially desirable when an electric arc is used as the source of heat, since the operation of the arc becomes more difficult with increase in pressure. Also, with other types of reactors, e.g., externally heated tubular reactors, the absolute pressure is preferably subatmospheric, e.g., in the range of 10–300 mm., but it can be atmospheric or even superatmospheric.

It is not necessary that the gaseous product emerging from the hot reaction zone be subjected to a special quenching treatment. Normal cooling of the gas by contact with unheated or water-cooled portions of the apparatus is sufficient to prevent appreciable decomposition of the cyanogen fluoride. If desired, however, special measures can be taken to cool the gaseous reaction product very rapidly, for example to bring it down to 400–500° C. or lower within one-tenth second or less after leaving the reaction zone. Rapid quenching is recommended if it is desired to increase the tetrafluoroethylene content of the fluorocarbon by-products which may be formed, especially at reaction temperatures above about 1700° C.

When an electric arc is used as the source of heat for the pyrolysis of cyanuric fluoride, the electrodes can be made of a heat- and corrosion-resistant metal such as copper or tungsten. If desired, such metal electrodes can be kept relatively cool through internal circulation of a cooling liquid, and under such conditions they remain substantially unattacked for considerable periods of time. Preferably, the arc electrodes are made of porous carbon or graphite. When using carbon electrodes, the anode can, if desired, be maintained at a relatively low temperature, below about 1500° C. This cooling, which is by no means essential, although it tends to increase the life of the electrode, can be accomplished by using a relatively thin anode supported by, and in intimate contact with, a water-cooled metallic holder. In a low tension arc, the cathode cannot be similarly cooled since its temperature must be high enough to sustain thermal emission of electrons.

Improved forms of carbon arc, for use in the synthesis of fluorocarbons, are described in U.S. Patent 2,709,192 and in other patents. These are suitable for use in the present process.

A preferred type of electric arc for use in this process is a magnetically rotated arc. In comparison with static arcs of conventional design or even with the improved arcs of the kind mentioned above, a rotating arc is far more efficient by virtue of its much greater stability and of the far better contact between arc and reactants that it permits. The electric arc used in Examples I and II was of this kind.

A particularly efficient type of rotating carbon arc operates as follows: The reactants (in this case, the vaporized cyanuric fluoride) pass through a symmetrical annular gap formed by a substantially cylindrical solid graphite cathode and a substantially cylindrical hollow graphite anode, wherein a continuous electrical discharge is rotated by magnetic lines of flux essentially parallel to the axis of rotation of the annular arc. This causes the arc to move at right angle to the magnetic field lines. The magnetic field is created by surrounding the arc chamber with a coil through which a current (preferably a direct current) passes. A field strength suitable to cause rotation is 100–200 gausses. The arc rotates extremely rapidly in the annular gap between the electrodes, its speed being estimated at 100–10,000 revolutions per second, and it heats the reactants very uniformly to extremely high temperatures as they pass through the gap. The gaseous reaction product leaves the arc chamber through the hollow anode and is immediately cooled by contact with cold portions of the apparatus or with a specially designed quenching unit.

The electrical characteristics of the rotating arc are essentially similar to those of the static arc. Thus, operating conditions of the arc may be varied over a wide range from the minimum voltage required to maintain the arc to very high voltages, e.g., in the range of 10 to 75 volts. In general, for a given current the required voltage of the arc is determined by the pressure in the system, the width of the arc gap, and the nature of the gases present in the arc chamber. The power requirements will, of course, depend on the quantity of reactants passed through the rotating arc and the temperature to which they are to be heated.

The arc may be operated with a direct current or with an alternating current if the alternating current is of high frequency and is employed in combination with an alternating magnetic field which is in phase with the arc current. A direct current is greatly preferred, since only with a direct current is it possible to obtain a truly continuous rotating arc resulting in uniform heating and high stability. Current intensities in the range of 20 to 500 amperes are generally used.

FIGURE 1 is a vertical section, more or less diagrammatical, of a form of reactor suitable for use in this invention. The apparatus illustrated is a rotating arc employing the principle discussed above.

Briefly described, the reactor comprises essentially a water-jacketed reaction chamber 1 made of silica glass, having a diameter of 2¾" and narrowing at its lower end to a ¾" diameter tube 2. The reaction chamber 1 is held inside a glass water-jacket 3 by means of a rubber seal 4 through which the tube 2 passes. Inside tube 2 is held, through the rubber bushing 5, a water-jacketed copper tube 6 serving as inlet for the gaseous reactants, which enter the reaction chamber through perforations 7. Tube 6 also serves as holder for the cathode 8, which is a graphite rod 3/16" in diameter, mounted on tube 6 through a graphite guide bushing 9, which also serves as the electrical contact for the cathode.

The anode is a graphite sleeve 10, 5/16" inside diameter, mounted on the inside of a hollow, ring-shaped copper holder 11, cooled with circulating water. The end of the cathode is concentric with the anode and essentially flush with the upper part of it, so that the arc flame is located in the annular space between anode and cathode.

Immediately above the arc zone is located a cooling, or quenching, unit consisting of a cylindrical copper vessel 12 open at the top, which may contain a coolant such as water, solid carbon dioxide or liquid nitrogen. The gases emerging from the arc zone impinge on the outside surface of vessel 12 where they are cooled, and they are drawn from the reactor through outlet tube 13, which leads to a system of cold traps (not shown) where the gases condense. The cooling vessel 12 is held in place inside a copper cylinder of 2" diameter 14 by means of a hollow ring-shaped lid 15 and a rubber gasket 16. In order to keep gasket 16 from becoming brittle when a very cold coolant is used, steam or hot water can be circulated inside the hollow lid 15 through pipes 17.

The reaction chamber 1, the anode holder 11 and the cooling vessel 12 are fastened together through appropriate threaded rods 18 and wing nuts 19. Reduced pressure is applied to the reaction chamber by means of a pump (not shown) connected to the exit end of the cold trap system.

The arc is rotated by means of a magnetic field generated by a D.C. current passing through the solenoid magnet 20, surounding the arc portion of the reaction chamber. This magnet is constructed of 250 turns of insulated, 8-gage copper wire. It is wired in series (wiring circuit not shown) with the arc, the current being supplied to the electrodes through terminal 21, which is directly attached to the cathode holder 6, and terminal 22, which is attached to the copper plate 23 holding the reaction chamber by means of the tie rods to the anode holder 11. The current is transmitted through the tie rods to the anode holder and thence to the anode.

The apparatus just described represents but one suitable type of electric arc reactor. Various modifications in form and design can be made without affecting the principle and operation of this process, which does not depend on the specific type of equipment used.

Figure 2:
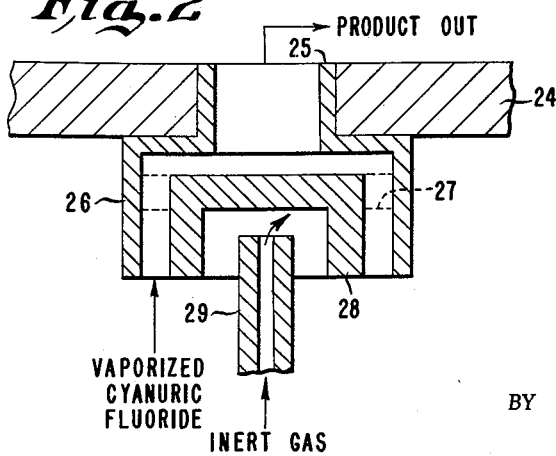

An example of such a modification is the electrode arrangement shown in section in FIGURE 2, which illustrates the already-mentioned embodiment wherein the reactants are passed through a short, very hot reaction zone heated by an electric arc without, however, passing through the arc flame itself.

In FIGURE 2, a hollow, water-cooled copper ring 24 serves as holder for a ring-shaped graphite anode 25 which flares out into a short cylinder of larger diameter 26 below the anode holder. A perforated graphite disc 27 connects, and maintains in electrical contact, the cylinder 26 with the inner portion of the anode, which is a hollow, inverted graphite cup 28. Inside this cup 28 is positioned a hollow graphite tube 29 serving as the cathode. The arc is struck between the tip of the cathode 29 and the inside wall of the cup 28, and thus is not in contact with the gaseous reactant mixture which passes with the narrow annular hot zone formed by the outside wall of the cup 28 and the inside wall of the cylinder 26 and leaves the reaction zone through the perforated disc 27. A slow stream of a substantially inert gas is passed at the same time through the hollow cathode 29 and helps to shield the reactant gases from contact with the arc flame. It will be understood that conventional gas conduits, electrical contacts, supports (not shown), etc., will be provided as desired.

The gaseous reaction product, after leaving the hot reaction zone, is conveniently collected as a condensate in traps maintained at a sufficiently low temperature, below about −70° C., for example by external cooling with liquid nitrogen or liquid air. This effects a first separation in that the carrier gas, if any is used, and the nitrogen and other non-condensable gases that may be formed in the pyrolysis are removed from the condensable products. The condensate thus obtained is found to contain at least 10% of cyanogen fluoride on a molar basis and usually considerably more, particularly at pyrolysis temperatures below about 2000° C.

If the collecting system is maintained at a higher temperature than that of liquid air or liquid oxygen, e.g., that of solid carbon dioxide (−78° C.), the condensate will be richer in cyanogen fluoride since part at least of the fluorocarbons (carbon tetrafluoride, hexafluoroethane and some tetrafluoroethylene) will pass through the traps uncondensed.

Alternatively, the condensate collected at liquid nitrogen temperature can be enriched in cyanogen fluoride by bringing it up to carbon dioxide temperature or higher. Such enriched mixtures, which may contain up to 50–90 mole percent of cyanogen fluoride or more, can be employed directly for most uses of cyanogen fluoride. Cyanogen fluoride of very good purity, that is, a product containing at least 85% of cyanogen fluoride, can be obtained by low temperature distillation of the reaction product, with or without preliminary enrichment.

Cyanogen fluoride is stable at low temperatures (e.g., at −78° C.) for long periods of time. Upon being maintained at room temperature in the liquid phase, it is gradually converted to a viscous liquid.

Cyanogen fluoride is a reactive compound which finds uses both as a nitrilating and a fluorinating agent. For example, it reacts with olefins to yield alpha,beta-fluoronitriles in accordance with the general method of cyanogen halide addition described in U.S. Patent 2,653,963, the beta-fluoronitriles being useful intermediates in the preparation of polymers, beta-fluorocarboxylic acids and other fluorine-containing products. Cyanogen fluoride also adds to olefins having internal double bonds in the presence of a strong acid catalyst in accordance with the general method described in U.S. Patent 2,689,868. Hydrolysis of these addition products leads to technically useful amines. Cyanogen fluoride is further useful as a volatile fumigant, disinfectant, and animal pest killer.

The examples which follow illustrate the invention in greater detail. Parts given are by weight.

*Example I*

Cyanuric fluoride vapor was mixed with nitrogen in a mole ratio of 1.03:1 (a weight ratio of 5 of cyanuric fluoride to 1 of nitrogen) under an absolute pressure of 60 mm. of mercury, and the mixture was passed at the rate of 4 liters per minute (calculated at the operating pressure) through a magnetically rotated carbon arc. The cathode was a graphite rod, 3/16" in diameter, and the anode was a hollow graphite cylinder having an internal diameter of 3/8", mounted on a water-cooled ring-shaped copper holder which serves to cool the anode. The arc was operated at 40 volts and 43 amperes. The gas mixture, after passing through the arc flame in the annular space between the electrodes, left the hot reaction zone through the hollow anode and encountered a liquid nitrogen-cooled copper surface about one inch downstream from the arc zone, where the gaseous reaction product was quenched. The gas was then led to traps cooled externally by means of liquid nitrogen.

The condensable product from 15 parts of cyanuric fluoride amounted to 7.9 parts. It was found by mass spectroscopic analysis to contain, on a molar basis, 20% of cyanogen fluoride, 44% of tetrafluoroethylene, 13.5% of carbon tetrafluoride, 6% of hexafluoroethane, 13.5% of cyanogen and 4.5% of dicyanoacetylene. There was no unreacted cyanuric fluoride.

*Example II*

The apparatus was the same as that used in Example I, with the difference however that the electrode arrangement was modified so that the reactants did not pass directly through the arc plasma, but instead through an arc-heated annular zone having an inside diameter of 9/16" and an outside diameter of 3/4", and a length of approximately 0.5". The temperature of this reaction zone was estimated to be of the order of 2000° C. The arc was operated at 40 volts and 44 amperes.

Cyanuric fluoride vapor was mixed with nitrogen in a mole ratio of 0.78:1 (a weight ratio of 3.76 of cyanuric fluoride to 1 of nitrogen) and the mixture was passed through the hot reaction zone at the rate of 4 liters per minute, calculated at the operating pressure. The off-gas was quenched as in Example I and led through cold traps cooled in liquid nitrogen. The condensable product from 15 parts of cyanuric fluoride amounted to 12.8 parts. This product was found by mass spectroscopic analysis to contain, on a molar basis, 72% of cyanogen fluoride, 8% of unreacted cyanuric fluoride, 8% of cyanogen, 4% of carbon tetrafluoride, 2.5% of higher fluorocarbons (tetrafluoroethylene and hexafluoroethane), 2.5% of trifluoroacetonitrile and minor amounts of other carbon-fluorine-nitrogen compounds.

*Example III*

A mixture of cyanuric fluoride vapor and nitrogen, the latter being used as a carrier gas, was passed through a graphite tube packed with carbon chips. The tube was heated in an induction furnace and the temperature of the hot zone was measured by an optical pyrometer. The gases emerging from the pyrolysis zone passed through a water-cooled copper tube and were then led to traps cooled in liquid nitrogen.

During a period of 30 minutes, 25 parts of cyanuric fluoride was vaporized under reduced pressure (60–65 mm. at the exit end of the apparatus) and passed through the pyrolysis zone at 1400° C., together with nitrogen at the rate of 400 ml./minute (measured at room temperature and atmospheric pressure). The product condensed in the cold traps (23 parts) was found by mass spectroscopy to contain, on a molar basis, 74% of cyanogen fluoride. The remainder consisted essentially of cyanogen, with some carbon tetrafluoride.

*Example IV*

Example III was repeated, except that the temperature of the pyrolysis zone was 1700° C. and the nitrogen was used at the rate of 450 ml./minute. From 26 parts of cyanuric fluoride was obtained 21 parts of condensate which contained, on a molar basis, 59% of cyanogen fluoride. The remainder comprised chiefly cyanogen and carbon tetrafluoride, with some tetrafluoroethylene and trifluoroacetonitrile.

*Example V*

Example IV was repeated, except that the temperature of the pyrolysis zone was 2000° C. From 24 parts of cyanuric fluoride was obtained 15 parts of liquid condensate containing 38% of cyanogen fluoride on a molar basis. The product contained also considerable tetrafluoroethylene and carbon tetrafluoride, with some trifluoroacetonitrile.

The products from this and the preceding two examples were combined, and the portion condensable at carbon dioxide/acetone temperature (−78° C.) was fractionally distilled at atmospheric pressure in a low temperature glass still with packed column of the Podbielniak type.

A central cut having a constant boiling point of −44° C. was collected. This was found by infrared analysis to contain at least 85–90% of cyanogen fluoride.

Example VI

Example IV was repeated at a pyrolysis temperature of 1700° C., except that the absolute pressure in the system (exit pressure) was 25 mm. of mercury. During a one-hour period, 43 parts of cyanuric fluoride was passed through the tube. The liquid condensate (40 parts) was distilled at atmospheric pressure in a low temperature glass still. The major fraction (19 parts) had a constant boiling point of −44° C. At −78° C. it was a water-white liquid, which was shown by infrared spectroscopy to contain 85% of cyanogen fluoride on a molar basis, with some tetrafluoroethylene, carbon tetrafluoride, cyanogen and trifluoroacetonitrile.

Example VII

Using the apparatus of Examples III–VI, 155 parts of vaporized cyanuric fluoride was passed through the pyrolysis tube at 1380–1460° C. during a period of 3 hours. The exit pressure in the system was 44 mm. and nitrogen at the rate of about 400 ml./minute (room temperature and atmospheric pressure) was used as the carrier gas. The product condensed in the liquid nitrogen-cooled traps was evaporated at atmospheric pressure through traps cooled at −78° C. The water-white liquid product condensed in these traps was distilled at atmospheric pressure in a Podbielniak still and the following fractions were obtained:

| | Parts |
|---|---|
| I. B.P. −44.5 to −44° C | 20 |
| II. B.P. −44 to −42° C | 46 |
| III. B.P. −42 to −29° C | 16 |
| IV. Residue boiling above −29° C | 20 |

Fractions I, II and III were liquid at −78° C. Infrared analysis showed that (I) contained 80% of cyanogen fluoride, the remainder being chiefly trifluoroacetonitrile; (II) contained at least 80% of cyanogen fluoride, with less than 5% of trifluoroacetonitrile; (III) contained about 60% of cyanogen fluoride, with much cyanogen. Fraction IV was a solid at −78° C., and consisted largely of cyanogen.

The foregoing detailed description has been given for clearness of understanding only and no unnecessary limitations are to be understood therefrom. The invention is not limited to the exact details shown and described for obvious modifications will occur to those skilled in the art.

The embodiments of the inveniton in which an exclusive property or privilege is claimed are defined as follows:

1. Process for preparing cyanogen fluoride which comprises heating cyanuric fluoride in the presence of an inert carrier gas to a temperature of 1200° C. to 4000° C. and separating from the gaseous reaction product a fraction containing at least 10% of monomeric cyanogen fluoride by cooling said gaseous product to a temperature below −70° C.

2. Process of claim 1 wherein said temperature is within the range of from 1300° to 1700° C.

3. Process of claim 1 wherein pyrolysis is effected at a pressure of from 10 to 300 mm. of mercury.

4. Process of preparing cyanogen fluoride which comprises passing cyanuric fluoride vapors with a substantially inert carrier gas through a reaction zone externally heated to a temperature of 1200° C. to 4000° C., withdrawing the gaseous reaction product from said reaction zone and separating therefrom a fraction containing at least 10% of monomeric cyanogen fluoride by cooling said gaseous product to a temperature below −70° C.

5. Process for preparing cyanogen fluoride which comprises passing cyanuric fluoride vapors with a substantially inert carrier gas through a reaction zone heated to a temperature in the range of 1300° C. to 1700° C. and collecting the gaseous reaction product after leaving the hot reaction zone as a condensate in traps externally cooled to below −70° C. said condensate containing at least 10% of cyanogen fluoride on a molar basis.

6. Process of claim 5 wherein said traps are cooled to a temperature of about −78° C.

7. Process of preparing cyanogen fluoride by pyrolysis of cyanuric fluoride which comprises passing cyanuric fluoride and an inert carrier gas directly through the flame of an electric arc wherein the temperature is in the range of about 2000° C. to 4000° C., collecting the gaseous reaction product and separating therefrom a fraction containing at least 10% of monomeric cyanogen fluoride by cooling said gaseous product to a temeprature below −70° C.

8. Process for preparing cyanogen fluoride which comprises passing vaporized cyanuric fluoride and an inert carrier gas through a reaction zone formed by the outside wall of a hollow, cup-shaped anode having positioned therein a hollow tubular cathode, said wall being heated uniformly by an electric arc inside it to a temperature of 1200° C. to 4000° C., collecting the gaseous reaction product and separating therefrom a fraction containing at least 10% of monomeric cyanogen fluoride by cooling said gaseous product to a temperature below −70° C.

9. The process of claim 4 wherein the temperature is in the range of 1300° C. to 1700° C.

10. The process of claim 7 wherein the pyrolysis is carried out at a pressure of from 10 to 300 mm. of mercury and the flame is provided by a magnetically rotated electric arc.

References Cited in the file of this patent

Sidgwick: "Chemical Elements and Their Compounds," Oxford at the Clarendon Press, London, vol. 1, (1950), page 678.

Smith's College Chemistry, Appleton-Century Co. Inc. (1946), page 232.